US008706390B2

(12) United States Patent
Kim et al.

(10) Patent No.: US 8,706,390 B2
(45) Date of Patent: *Apr. 22, 2014

(54) GYROSCOPIC STABILIZED VEHICLE

(75) Inventors: Daniel Kee Young Kim, San Francisco, CA (US); Kevin Bretney, San Diego, CA (US); Andrew L. Tsang, Medford, MA (US)

(73) Assignee: Lit Motors Corporation, San Francisco, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/875,041

(22) Filed: Sep. 2, 2010

(65) Prior Publication Data

US 2011/0231060 A1    Sep. 22, 2011

Related U.S. Application Data

(60) Provisional application No. 61/314,540, filed on Mar. 16, 2010.

(51) Int. Cl.
*G06F 17/10* (2006.01)
*G06G 7/48* (2006.01)
*B60K 17/30* (2006.01)

(52) U.S. Cl.
USPC ............ 701/124; 446/440; 446/468; 180/252

(58) Field of Classification Search
USPC ............ 105/4.4; 180/6.2–6.7, 400–447, 252; 188/350; 280/5.5–6.16; 700/245, 279; 701/36, 41, 124; 446/440, 468
See application file for complete search history.

(56) References Cited

U.S. PATENT DOCUMENTS 3,749,194 A * 7/1973 Bardwick, III ............... 180/165
5,460,239 A * 10/1995 Jensen .......................... 180/302
(Continued)

FOREIGN PATENT DOCUMENTS

| EP | 56060780 | 5/1981 |
| FR | 2678230 | 12/1992 |
| GB | 2465020 | 5/2010 |
| WO | WO-2008072043 | 6/2008 |

OTHER PUBLICATIONS

The Brennan Gyro-Monorail, Updated May 21, 2009, The Museum of RetroTechnology, http://www.douglas-self.com/MUSEUM/LOCOLOCO/brennan/brennan.htm.*

(Continued)

*Primary Examiner* — Khoi Tran
*Assistant Examiner* — Abby Lin
(74) *Attorney, Agent, or Firm* — Blakely Sokoloff Taylor & Zafman, LLP

(57) ABSTRACT

Embodiments of the invention describe receiving, via a plurality of sensors, data indicating vehicle information. Said information may indicate at least orientation of a frame of a vehicle, orientation of a front wheel of the vehicle with respect to the frame, orientation and rotational speed of a first and second flywheel, and speed of the vehicle. In one embodiment, each flywheel is included in a first and second gyroscope coupled to the vehicle frame. Based, at least in part, on the data received from the plurality of sensors, at least one of the orientation and rotational speed of at least one of the flywheels may be adjusted. Said adjustment may further be based on an input to change at least one of speed and direction of the vehicle.

19 Claims, 13 Drawing Sheets

(56) References Cited

U.S. PATENT DOCUMENTS

| | | | |
|---|---|---|---|
| 5,820,439 A | 10/1998 | Hair, III | |
| 5,960,900 A * | 10/1999 | Cheng | 180/165 |
| 6,170,847 B1 | 1/2001 | Pham | |
| 6,482,069 B1 | 11/2002 | Tibor et al. | |
| 2002/0055407 A1 * | 5/2002 | Druten et al. | 475/207 |
| 2004/0040756 A1 | 3/2004 | Nmngani | |
| 2004/0098185 A1 | 5/2004 | Wang | |
| 2005/0045398 A1 | 3/2005 | Suzuki | |
| 2007/0155558 A1 | 7/2007 | Horst et al. | |
| 2007/0162217 A1 | 7/2007 | Selbe | |
| 2007/0257451 A1 * | 11/2007 | Furuta et al. | 280/5.501 |
| 2008/0227365 A1 | 9/2008 | Lo | |
| 2008/0295595 A1 * | 12/2008 | Tacklind et al. | 73/462 |
| 2008/0302183 A1 * | 12/2008 | Peng et al. | 73/504.12 |
| 2009/0124168 A1 * | 5/2009 | Berera et al. | 446/456 |
| 2010/0090440 A1 * | 4/2010 | Reichstetter et al. | 280/293 |
| 2010/0152953 A1 | 6/2010 | Hamilton | |
| 2010/0286888 A1 * | 11/2010 | Simons | 701/99 |
| 2011/0016996 A1 * | 1/2011 | Suda et al. | 74/5.1 |
| 2011/0231085 A1 * | 9/2011 | Kim et al. | 701/124 |

OTHER PUBLICATIONS

Akinlua et al, Gyroscopic Stabilization of Unstable Vehicles, University of Michigan, Apr. 17, 2007.*

Gyro Monorail, AbsoluteAstronomy.com, Apr. 18, 2009 version, courtesy of Internet Archive Wayback Machine.*

International Search Report & Written Opinion mailed Mar. 25, 2011 for Int'l Application No. PCT/US2011/022409.

"Notice of Allowance for U.S. Appl. No. 12/875,047", (Jul. 29, 2013), Whole Document.

"Office Action for U.S. Appl. No. 12/875,047", (Feb. 25, 2013), Whole Document.

"Office Action for U.S. Appl. No. 12/875,055", (Mar. 4, 2013), Whole Document.

Pergiel, Charles, "Pergelator: Gyro Bike", (Jun. 13, 2007), 7 pgs.

Spry, et al., "Gyroscopic Stabilization of Unstable Vehicles: Configurations, Dynamics, and Control", (Mar. 31, 2008), 14 pgs.

* cited by examiner

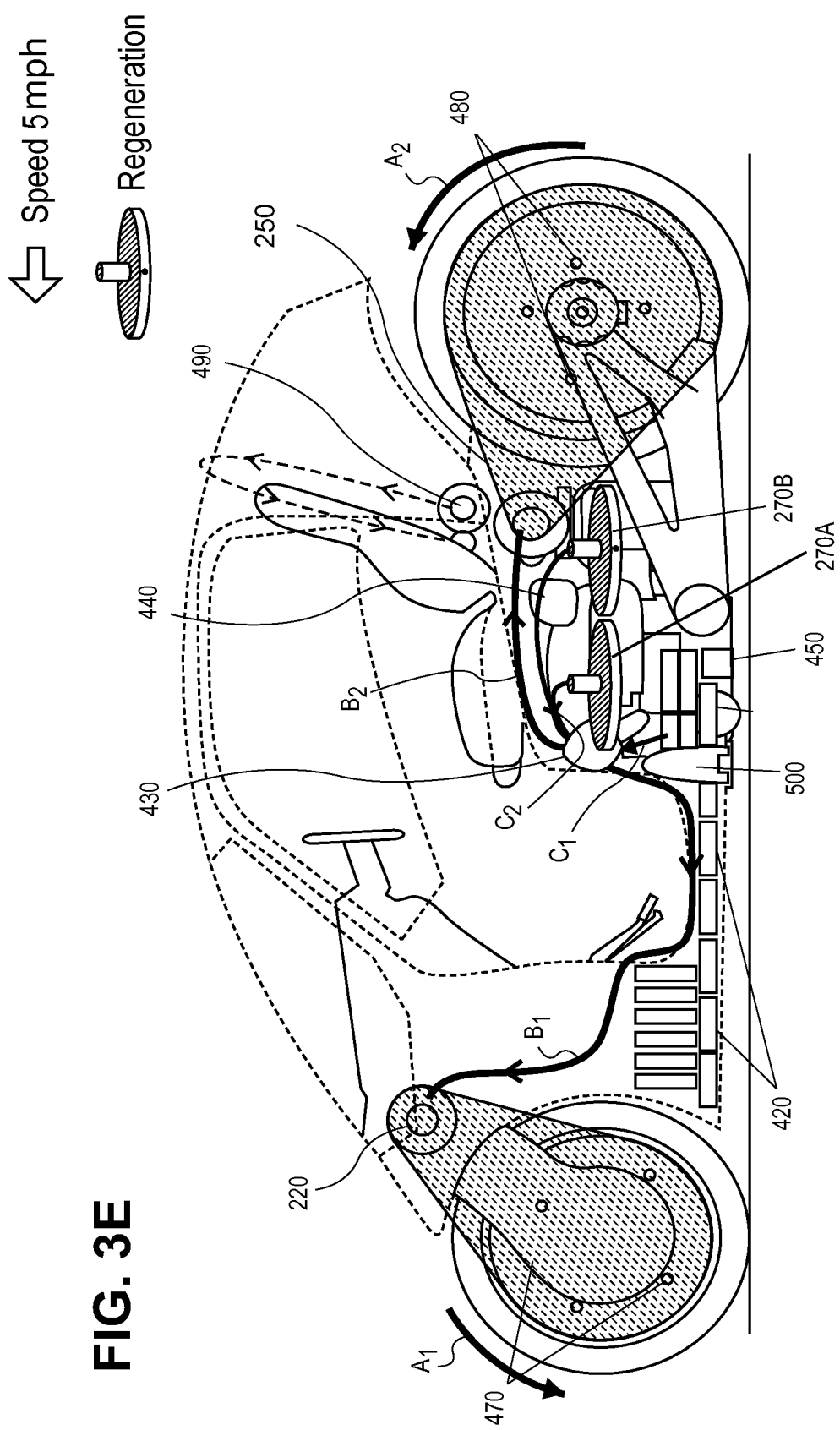

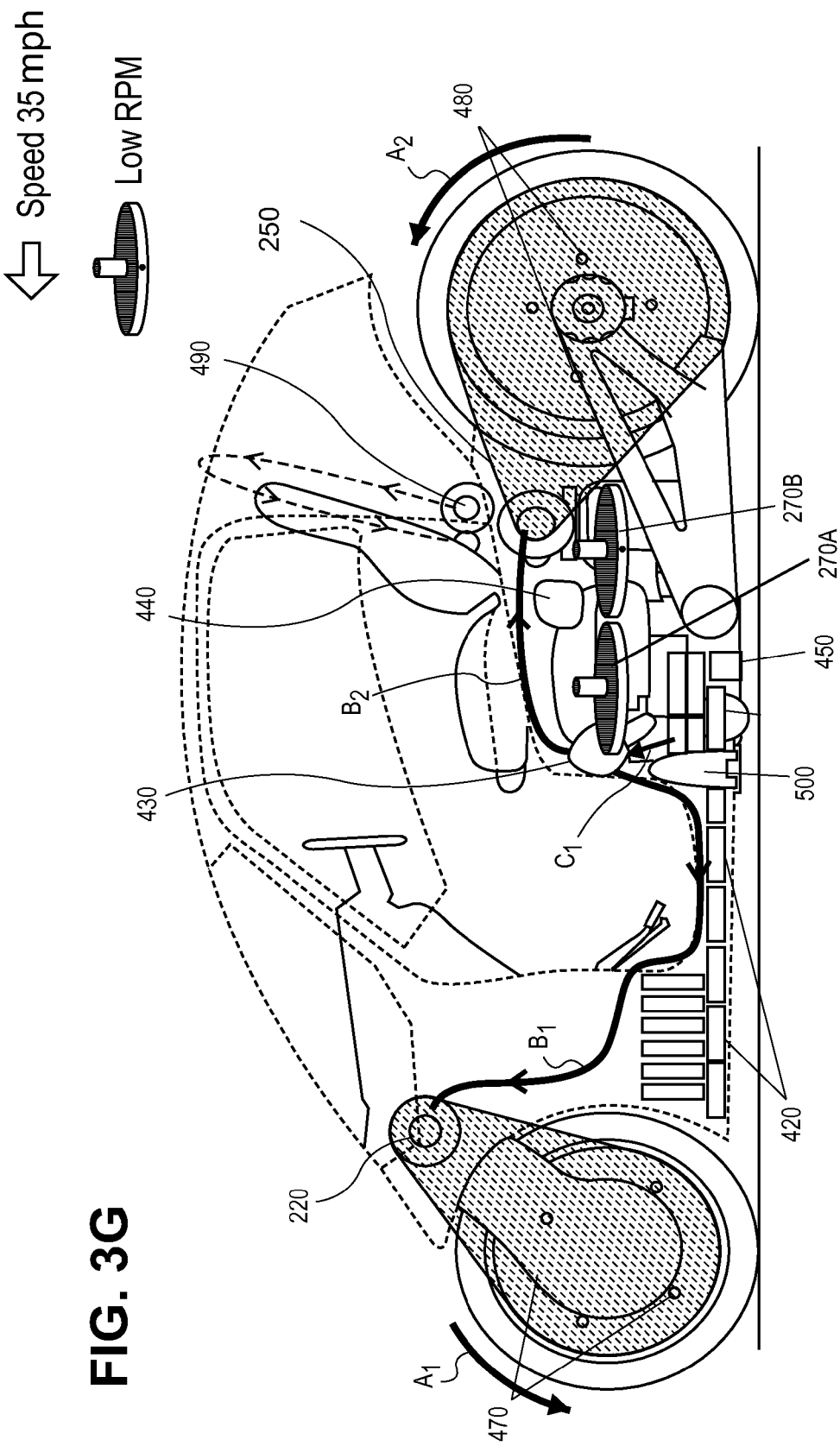

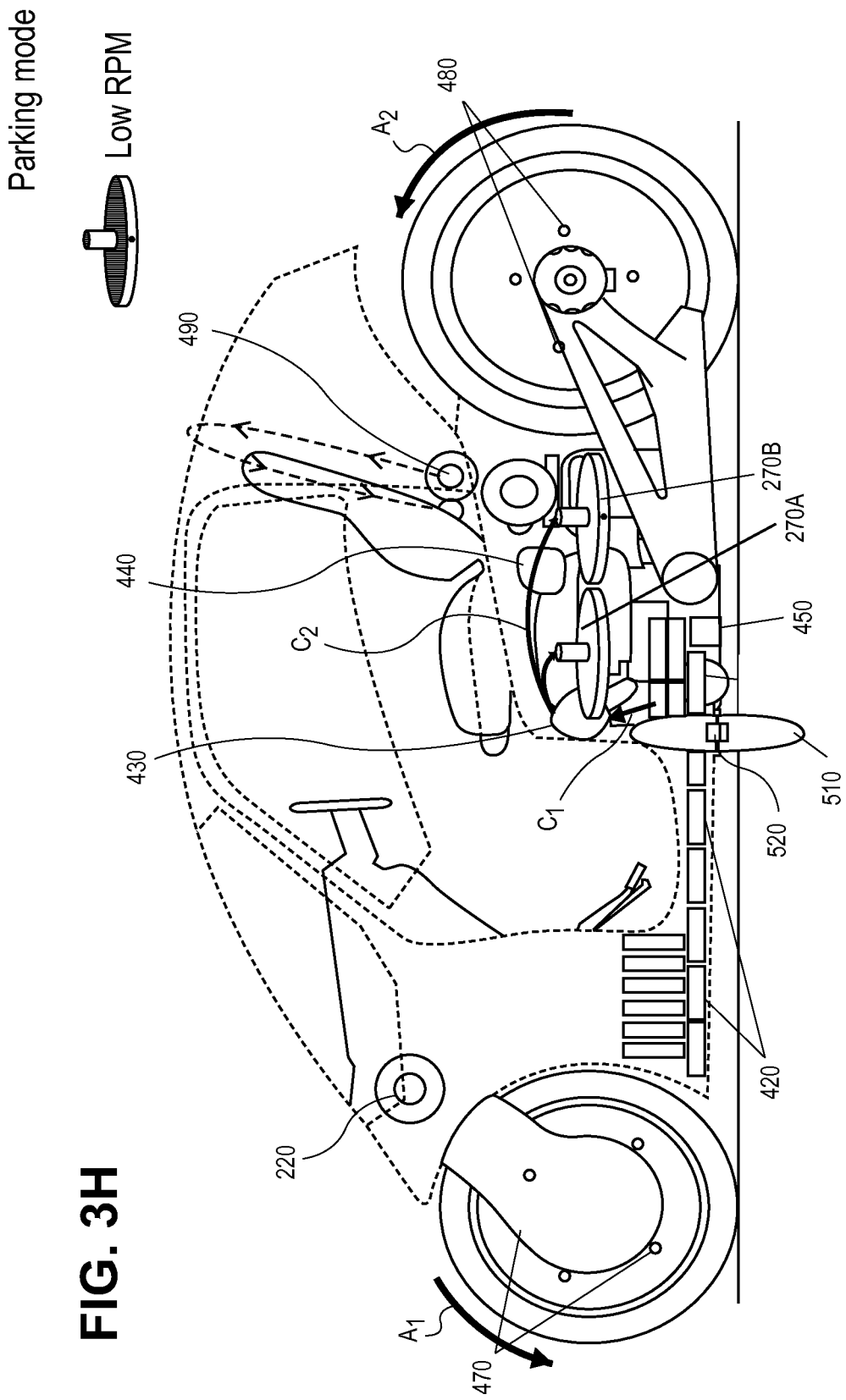

GYROSCOPIC STABILIZED VEHICLE

CLAIM OF PRIORITY

This application claims priority to Provisional Application No. 61/314,540 filed on Mar. 16, 2010.

FIELD OF THE INVENTION

Embodiments of the invention relate to transportation vehicles, and more particularly to a gyroscopic stabilized vehicle.

BACKGROUND

Rising energy costs and the impact of greenhouse gases on the environment have created a growing need for high efficiency vehicles with a low carbon footprint. Inline-wheeled vehicles, such as motorcycles and scooters, offer higher efficiency than conventional four-wheeled cars; however, this efficiency is mainly due to the physical differences between inline-wheeled vehicles and four wheeled cars—e.g., reduced weight, fewer friction surfaces, and reduced drag. Furthermore, many users are unwilling or unable to operate motorcycles and scooters due to the exposure to weather and wind, safety concerns in the event of crashes, and the skills required to maintain vehicle stability during vehicle use.

Solutions to reduce inline-vehicle user exposure to weather and wind have typically been limited to devices partially shielding the driver from the elements (e.g., a windshield) in order to allow the user to use his feet to help stabilize the vehicle during low-speeds. Furthermore, while there have been some solutions to attempt the build an enclosed user cabin for an inline-wheeled vehicle, these solutions either require additional (though smaller) wheels to stabilize the vehicle or do not provide for vehicle stability during all potential and foreseeable uses. Prior art solutions that attempt to electronically stabilize an inline-wheeled vehicle have also failed to provide for resource and energy efficient solutions to maximize the overall efficiency of the vehicle.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "In an alternate embodiment" appearing herein describe various embodiments and implementations of the invention, and do not necessarily all refer to the same embodiment. However, they are also not necessarily mutually exclusive.

FIGS. 3a-h show partial cutaway side views of vehicle in different states, indicating energy flows according to an embodiment of the invention.

Figure 1:
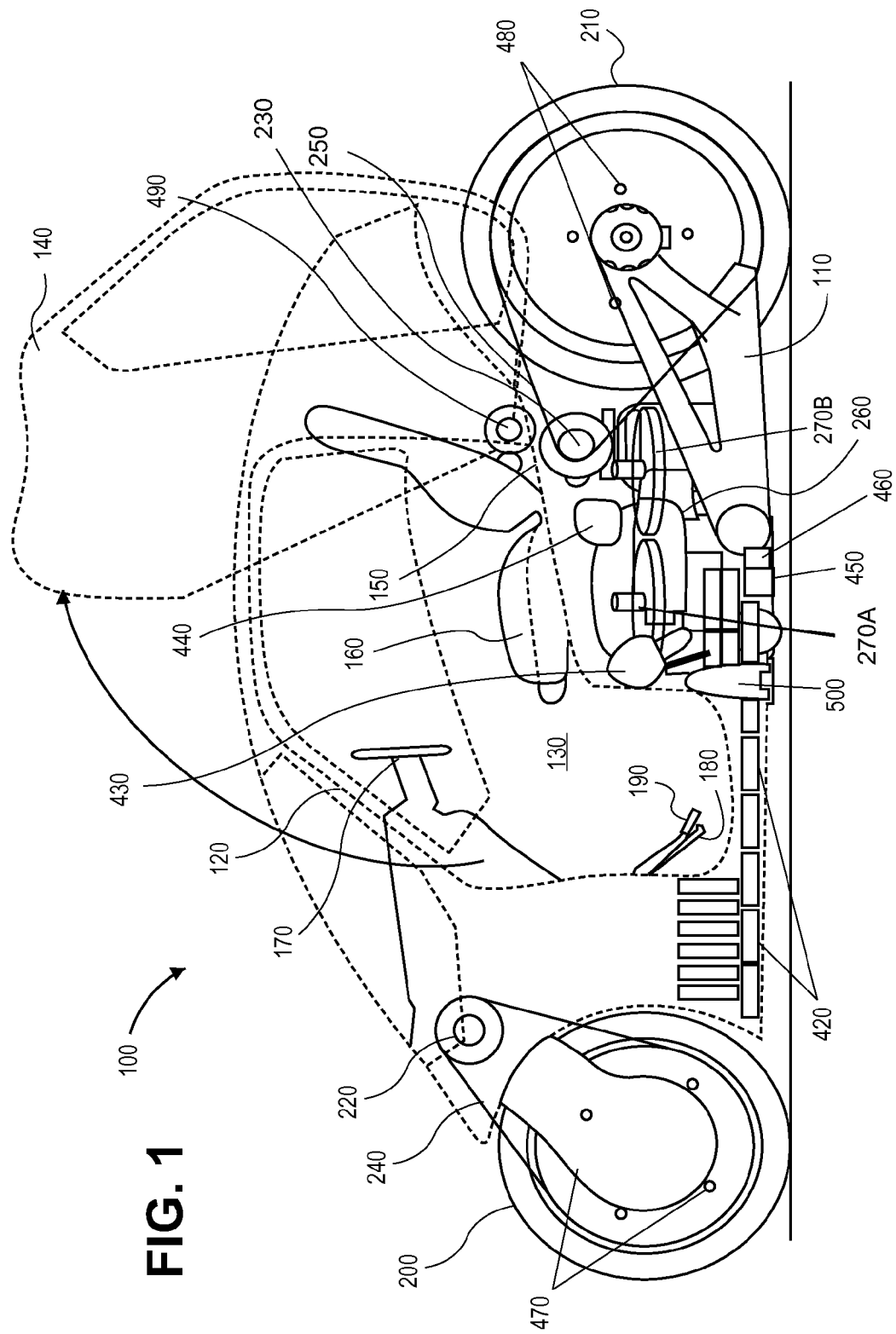
FIG. 1 shows a partial cutaway side view of a vehicle including embodiments of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

The basic concept of using gyroscopes to maintain a two-wheeled vehicle upright by using flywheel precession to generate counter-torque is known (while reference is made to gyro-stabilized two-wheeled vehicles in this Specification, the principles of gyro-stabilization may also be used in any vehicles which have a narrow track width such that gyro-stabilization is used to stabilize the vehicle or to augment their suspension system in providing stability); however, such systems have not become common for a variety of reasons, including the lack of a design for a suitable control system for a vehicle to operate safely at highway speeds and in all conditions.

Previous attempts to incorporate flywheel stabilization added great complexity and therefore weight to the vehicles due to the additional mechanical drive-trains, power and fuel (or battery) requirements. Additionally, the flywheels themselves consumed a non-trivial amount of energy and so negated the inherent efficiency advantages of the two-wheeled vehicle itself. However, advances in electric drive systems utilizing motor-generators allow for zero emission power for a vehicle, and provide the ability to use regenerative braking principles to recover greater amounts of energy when slowing down the vehicle. This, combined with advancements in energy storage density, allow for an extended range even with additional power used for gyro-stabilization.

The basic equations governing these effects are known and described by equations. The moment of inertia (I) for a solid disk is given by $I=\frac{1}{4}*m*r^2$, with m being the mass of the disk and r being the radius. For a given vehicle weight and center of gravity (CG), a gyro stabilizer flywheel may be sized so that the vehicle's vertical stability may be controlled indefinitely while stopped. The radius, the mass, and the geometry of the flywheel may be selected to maintain both a compact size which can fit within the vehicle frame and still be able to provide an effective moment of inertia I.

Causing a rotating flywheel to precess about an axis which is normal to the flywheel axis of rotation will create a counter-torque orthogonal to both the axis of rotation and the axis of precession. The useful counter-torque $\tau$ of a gimbaled flywheel assembly is given by the equation: $\tau = I_{disk} * \omega_{disk} * \omega_{axis}$. The rotational velocity of the flywheel plays a large role in the amount of useful torque $\tau$ available to stabilize the vehicle. As one of the only controllable variables in the governing equation for a selected flywheel mass and geometry, flywheel rotational velocity can be controlled to compensate for the varying static load and load distribution of the vehicle and consequently the correctional ability of a gyro stabilizer.

Additional variables used in the control of the vehicle include:

$\theta_{Vehicle}$ is the tilt of the vehicle from side to side measured in radians $V_{Vehicle}$ is the velocity of the vehicle as it moves down the road measured in meters per second $\omega_{disk}$ is the rotational velocity of the flywheel measured in radians per second $\phi_{axis}$ is the tilt of the flywheel from vertical, measured in radians $\omega_{axis}$ is the rotational velocity of the tilt of the flywheel, measured in radians per second $\theta_{steering}$ is the steering input, measured in radians Using inputs $\theta_{Vehicle}$, $V_{Vehicle}$, $\omega_{Flywheel}$, $\omega_{axis}$, $\phi_{axis}$, and $\theta_{Steering}$, the $\theta_{Vehicle}$ can be controlled by changing $\omega_{axis}$, which outputs a torque orthogonal to $\phi_{axis}$ so as to oppose or increase changes to $\theta_{Vehicle}$. As $\phi_{axis}$ approaches 90° or $$\frac{\pi}{2}$$

radians, the gyro's effectiveness in changing $\theta_{Vehicle}$ decreases because the torque output is orthogonal to $\phi_{axis}$. The control of $\phi_{axis}$ and $\theta_{Vehicle}$ by actuating $\omega_{axis}$ can be accomplished by using a modern control system including major and minor loop control or state space. Consequently, two outputs, $\phi_{axis}$ and $\theta_{Vehicle}$ may be accounted for at the same time with priority going to ensuring $\theta_{Vehicle}$ is stable.

Flywheel geometry and material and precession motor sizing (which determines the correctional ability of the gyro system) may depend on variables such as: the vehicle weight and center of gravity at anticipated load conditions, maximum vehicle speed, maximum turn rate, and anticipated environmental conditions (e.g. cross winds, variations in road gradients, & etc.). In one embodiment, the physical size and mass of the gyro assembly may be as small as possible for packaging and efficiency purposes. Embodiments of the invention may further be utilized by two wheeled vehicles substantially narrower than a traditional car or truck which therefore abides by motorcycle laws. The flywheel mass is selected such that when rotating in the desired speed range, a single flywheel may be capable of correcting an unstable state of the overall vehicle and its contents for an extended period of time. Flywheel material selection is driven primarily by the tradeoffs between material density ($\delta$), material strength, energy storage ability and overall weight. Energy storage (E) is related to moment of inertia and velocity-squared by the equation: $E_{disk} = \frac{1}{2} * I_{disk} * \omega_{disk}^2$. Higher density material may allow for a smaller overall package, but greater flywheel mass requires larger drive motors and hence greater weight and space requirements.

Additionally, a flywheel with great mass may either be less responsive to acceleration requests (i.e. spinning up to a given speed will take longer) or may require a much larger drive motor to accelerate the flywheel within a given time. The flywheel mass may be optimized to increase efficiency of the vehicle, and minimizing the gyro mass helps to keep the overall vehicle mass lower, which means less energy consumption in operating the vehicle. In one embodiment, the flywheel materials are carbon fiber or Kevlar, selected for their high tensile strength for their weight, allowing higher rotation speeds (i.e. greater than 10,000 rpm) and more responsive acceleration. Higher density materials such as steel, brass, bronze, lead and depleted uranium may also be used; however it is understood that the tensile strength of these materials does not allow for higher rotational speeds which limits their usefulness in minimizing the size and mass of the flywheel.

Based on the geometry of the disc, the moment of inertia can range from $\frac{1}{4} * m_{disk} * r_{disk}^2$ to $\frac{1}{2} * m_{disk} * r_{disk}^2$. Because the amount of torque output by the precessing gyro is given by $\tau = I_{disk} * \omega_{disk} * \omega_{axis}$, increasing the $I_{disk}$ with the other inputs held constant means a greater $\tau$. Therefore $\tau$ may be maximized for a given size and weight constraint to keep the vehicle usable and efficient. However, $I_{disk}$ and $\omega_{disk}$ are related because as $I_{disk}$ increases, the motor spinning the gyro needs to become more powerful to achieve the desired $\omega_{disk}$ in an acceptable amount of time.

The Output Torque ($\tau$) of the gyro assembly in the X-direction also depends on the Angular Position of the gyro ($\phi_{axis}$). Output Torque ($\tau$) is maximized when the gyro's rotation is pointed vertically down or up. As the $\omega_{axis}$ increases, the gyro disc's rotation direction will move faster towards or away from vertical. If the vehicle needs to be stabilized for a longer period of time, the $\omega_{axis}$ may be minimized to maximize the amount of time that an acceptable Output Torque ($\tau$) is produced.

When the vehicle is coming to a stop and has low forward velocity (and therefore low rotation speed of the wheels), the torque in the forward direction exerted by the lean of the vehicle is described by the equation $M_x = r * f * \sin(\theta_{Vehicle})$, where r is the height of the center of gravity for the vehicle, f is the force of gravity on the vehicle, and $\theta_{Vehicle}$ is the amount of lean from vertical. The moment exerted by the precession of a flywheel is described by the equation $M_x = I_{disk} * \omega_{disk} * \omega_{axis} * \sin(\theta_{diskaxis})$. For a nominal 500 kg vehicle moving at low speeds, the moment exerted by a vehicle with a center of gravity 0.75 m above the ground and tipping 30 degrees from vertical is 1131 N-m. To keep the vehicle stable would therefore require 1131 N-m of counter-torque, but to move the vehicle upright, an excess of counter-torque may be required. In order to counter that tipping motion, a moment $M_x$ may need to be introduced by precessing the gyro stabilizer flywheel. If multiple flywheels are utilized, their moments are additive.

A lean of 30 degrees is more than one would deal with in real world situations not involving a failure of the stability system, so a flywheel disk approximately of 7 kg with a radius of 0.15 m and a moment inertia of 0.070 kg-m-m, spinning at 1570 rad/s, and precessing at 10.47 rad/s, with its axis vertical should exert a moment of 1295 N-m. In one embodiment, two identical flywheels are used, spinning in opposite directions and precessing in opposite directions so that the moment is exerted in the same direction, but the yaw moment $M_z$ of the two flywheels together would equal zero. The flywheels may each be sized such that in the case of the failure of one flywheel, the remaining flywheel is able to stabilize the vehicle in most situations. Therefore, for the nominal 500 kg vehicle under the conditions described above, having a rolling moment of 1131 N-m, two flywheels would produce 2590 N-m of counter-torque which would be sufficient to maintain or correct the lean of the vehicle, and in the event of a partial failure of one flywheel the remaining flywheel could provide sufficient correctional moment to control the vehicle to place it in a safe condition. The flywheels may also be of equal size, or differing sizes.

Thus, it is to be understood that, at least in light of the above description and the figures below, embodiments of the invention describe an apparatus and methods to receive, via a plurality of sensors, data to indicate information describing a vehicle state. This information may include, but is not limited to, orientation of the vehicle frame, orientation of a front wheel of the vehicle with respect to the frame, orientation and rotational speed of gyroscope flywheels included in the vehicle (i.e., gyroscopes coupled to the vehicle frame), and the current speed of the vehicle. Said gyroscopes may be aligned lengthwise with respect to the front and rear wheel of the vehicle, widthwise with respect to the frame of the vehicle (e.g., side-by-side), or heightwise with respect to the frame of the vehicle (e.g., stacked).

Based at least in part on data received from said sensors, the orientation or the rotational speed of (at least) one of the flywheels may be adjusted. Embodiments of the invention may further adjust the orientation or the rotational speed of (at least) one of the flywheels further based on an input to change the speed (e.g., acceleration or brake input) or direction (e.g., steering wheel input) of the vehicle. For example, embodiments of the invention may cause the rotational speed of one of the flywheels to be reduced when an acceleration input is detected, or cause the rotational speed of one of the flywheels to be increased when a brake input (i.e., an input to engage a front or rear wheel brake) is detected; if it is determined the vehicle will execute a turn (i.e., a change in the orientation of the front wheel with respect to the frame is detected), embodiments of the invention may adjust the orientation or the rotational speed of at least one of the flywheels to maintain stability during the turn.

Using gyro stabilizer flywheels to receive and transfer energy back into a drive system provides the advantages of a lighter weight and more efficient two-wheel vehicle which can include an all weather interior cabin having recumbent seating, with the high energy efficiency of a regenerative braking system and zero emissions propulsion. Transferring energy between the flywheels motor(s)/generator(s) and the drive wheel motor(s)/generator(s) through the energy storage unit during vehicle's acceleration and deceleration maintains up to 95% energy efficiency and vehicle stability, thereby substantially increasing the range of the vehicle. A gyro stabilized vehicle without this power transfer system may be significantly handicapped due to the increased power requirements of the gyro stabilizer compared to a conventional non-stabilized vehicle.

Lower speed urban travel is generally the most energy intensive regime for traditional vehicles, due to the energy lost in frequent braking and acceleration (both from the energy input into the brakes, and the energy used to accelerate the vehicle that is lost to subsequent braking). Therefore, it is to be understood that a great leap in energy efficiency may be achieved by providing a gyro-stabilized vehicle that can travel on two-wheels, accommodate recumbent passenger arrangements, provide the safety of an all-weather enclosed passenger cabin, provide driving controls similar to a conventional car, and which can greatly improve the range and efficiency of a gyro-stabilized vehicle by integrating the stabilizing flywheels into a regenerative braking system.

At lower speeds, such as when the vehicle is accelerating from a stop or slowing to a stop, or at speeds common in urban areas and stop-and-go traffic situations, the self stabilization properties of the vehicle are not sufficient to maintain the upright orientation of the vehicle. Consequently, in the prior art much more skill is required from the rider to operate the unstabilized vehicle, and the rider may be required to use his or her own physical strength to balance the vehicle at a stop diminishing the utility and equal accessibility.

Gyro-stabilization at low speeds and at stop also presents a simpler control problem than that encountered at higher speeds. A gyro stabilizer may be mounted to a vehicle through gimbal mountings, utilizing the gimbal motors to precess the gyros to create counter-torque against vehicle roll moment. Vehicle state can be measured by inertial and absolute position sensors mounted to the vehicle which can then be used to determine the amount and rate of precession required to provide sufficient counter-torque to maintain the vehicle upright. Generally, the restorative ability of the gyro stabilizer may be able to stabilize a vehicle with a passenger for a sufficient amount of time such as may be encountered at a stop light or stop sign. In one embodiment, when the vehicle is stopped for prolonged periods or turned off, the vehicle may support itself by an automatically deployed mechanical support.

In one embodiment, the gyro stabilizer flywheel(s) and drive wheel(s) are coupled to their own respective motor-generator(s) which can operate in a motor-mode to drive their respective loads, or switch to a generator-mode to slow the rotating loads and harvest this energy for transfer to other loads. The electrical power system includes an energy storage unit to provide temporary storage of electrical energy while transferring it between the drive/braking system and the gyro stabilizer flywheels or for longer durations of time such as when the vehicle is powered off.

A system controller receives sensor data from the vehicle's state sensors (inertial and absolute), the gyro stabilizer's state sensors, and other parameters to control the amount and timing of correctional torque imparted by the gyro stabilizer.

A gyro stabilizer includes at least one actively gimbaled flywheel coupled to a vehicle. In one embodiment, a gyro stabilizer includes first and second counter-rotating flywheels which are independently gimbaled. Each flywheel may be mounted with a vertical axis of rotation in a neutral position and with the gimbal axes parallel to each other. In this embodiment, the counter-rotating flywheels are precessed in opposite directions, such that their counter-torque is additive, but their yaw effects on the vehicle cancel each other.

Use of two flywheels also allows each individual flywheel to be made more compact in order to fit within the narrow frame of the vehicle. Additionally, in the event one flywheel fails, the second flywheel can be used to provide adequate stability during an emergency stop of the vehicle to place it in a safe condition. In the case of either flywheel failure or emergency balance situation, a failsafe protocol engaging the deployment to the mechanical landing gear may be used to keep the vehicle upright and maintain the driver's safety.

Referring to FIGS. 1-6, embodiments of the invention comprising a regenerative-powered gyroscopic stabilization apparatus are shown installed in inline two-wheeled vehicle 100. In this embodiment, vehicle 100 comprises vehicle frame 110, vehicle body 120 enclosing vehicle interior 130 and access door 140 which rotates open about a hinge mechanism 150. Recumbent operator's seat 160 may be provided with driving controls including steering unit 170, accelerator 180 and brake 190. In this embodiment, said driving controls are arranged in the familiar layout of conventional automobiles having steering wheels and pedals.

In this embodiment, vehicle 100 further includes first and second drive wheels 200 and 210 respectively. First and second drive wheels motor generators 220 and 230 are coupled to drive wheels 200 and 210, respectively, through drive chains 240 and 250, respectively.

In this embodiment, gyro stabilizer 260 is coupled to vehicle 100 through vehicle frame 110. Gyro stabilizer 260 may include first and second gyro assemblies housing flywheels 270a and 270b (said gyro assemblies similar to assembly 260a), which in this embodiment are essentially identical. It is to be understood that in other embodiments, the first and second gyro assemblies/flywheels may differ in size and material composition.

Figure 2:
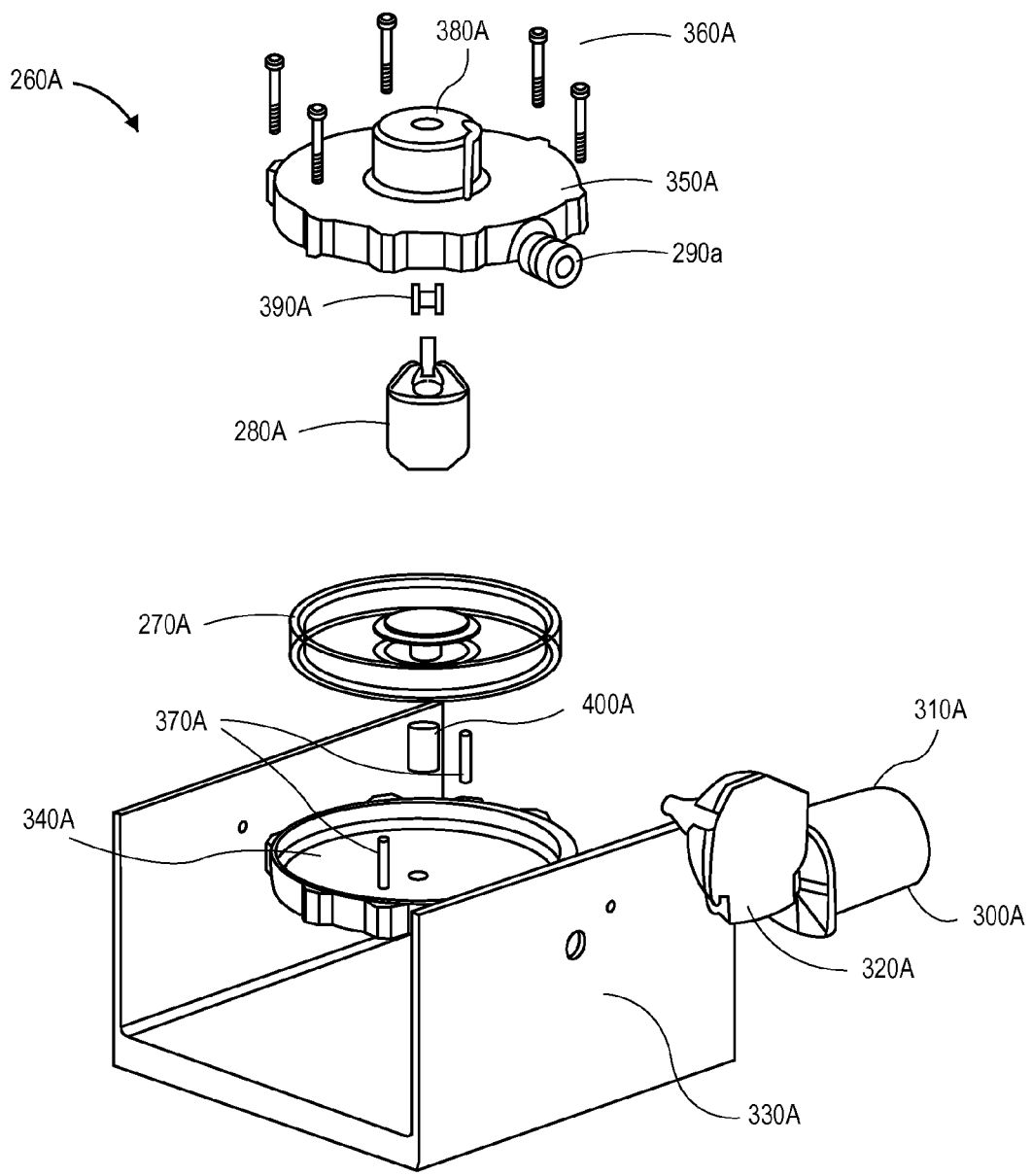
FIG. 2 shows an exploded view of a flywheel assembly.

First gyro assembly 260a, as shown in FIG. 2, includes flywheel 270a, flywheel motor-generator 280a coupled to flywheel 270a, gimbal 290a coupled to flywheel 270a, and precession motor 300a having drive portion 310a coupled to gimbal 290a and frame portion 320a coupled to vehicle 100. In this embodiment, precession motor-generator frame portion 320a is coupled to vehicle 100 through mounting bracket 330a, which is fixedly mounted to vehicle frame 110.

Flywheel 270a is contained within a gyro housing having a bottom portion 340a and top portion 350a, which in this embodiment are assembled using threaded fasteners 360a and alignment pins 370a. Gyro housing top portion 350a includes gimbal 290a, which provides the precession axis for precessing the gyro assembly to create the counter-torque that may maintain stability for vehicle 100, as well as a bearing housing 380a to support flywheel 270a. Motor-generator mount bolts 390a and flywheel mount bolts 400a are provided to couple flywheel motor-generator 280a, flywheel 270a and the gyro housing. In this embodiment, flywheel 270a and flywheel motor-generator 280a are both contained within gyro upper and lower housing portions 340a and 350a, for ease of maintenance and protection. Gyro stabilizer 260 may theoretically be located anywhere on the vehicle so long is it can be coupled to the vehicle frame 110 in order to transmit the counter-torque of the first and second precession motors (e.g., motor 300a) to vehicle frame 110. In this embodiment, gyro stabilizer 260 is located approximately at the anticipated vertical and fore-aft center of gravity ("CG") of vehicle 100 at standard conditions.

Referring to FIGS. 1, 3a-h and 4, energy storage unit 410 is provided including battery bank 420, capacitor bank 430, and a power switching circuit in electrical communication with battery bank 420, capacitor bank 430, first and second drive wheel motor-generators 220 and 230, and with first and second flywheel motor-generators 270a & b. In one embodiment, battery bank 420 includes battery cells located in locations distributed along vehicle frame 110 so as to distribute the weight and fit within the frame of the vehicle. Battery bank 420 may be charged by plugging into a charging station or electrical wall outlet at a parking space or garage, or one or more battery cells may be physically exchanged to provide a fresh charge.

Referring to FIGS. 1, 3a-h, 4, 5 and 6, a control system including a plurality of sensors producing electronic signals is illustrated. Said plurality of sensors may indicate at least the absolute state and inertial state of vehicle 100 and gyro stabilizer 260. This example control system further includes system controller 440 in electronic communication (via any communication means known in the art) with the plurality of sensors, first and second drive wheel motor-generators 220 and 230, first and second flywheel motor-generators 280a & b of energy storage unit 410, accelerator 180, brake 190 and steering unit 170. In this embodiment, the plurality of sensors comprises Flywheel State Sensors 560 coupled to each flywheel, Vehicle Inertial State Sensors 570, Vehicle Absolute State Sensors 580, and Vehicle State Sensors 590. The plurality of sensors include at least three-axis orientation sensor 450 coupled to vehicle frame 110 providing data indicating vehicle rotation and angle, accelerometer 460 coupled to vehicle frame 110 providing data indicating vehicle linear acceleration, first and second drive wheel speed sensors 470 and 480, and vehicle tilt sensor 490. In this embodiment, tilt sensor 490 includes a left-side and right-side infrared laser which measures distance to ground from a fixed point on vehicle 100, thus providing a control input for in situ calibrating of orientation sensor 450 and safety backup for orientation sensor 450. System controller 440 receives data from the plurality of sensors indicating one or more of first and second flywheel tilt angle, tilt velocity (i.e. the rate at which the precession motors are rotating flywheels 270a & b about their respective gimbals), flywheel disc velocity (i.e. the rotational velocity of flywheels 270a & b). Compass and Global Position System (GPS) sensors may also be provided.

Figure 5:
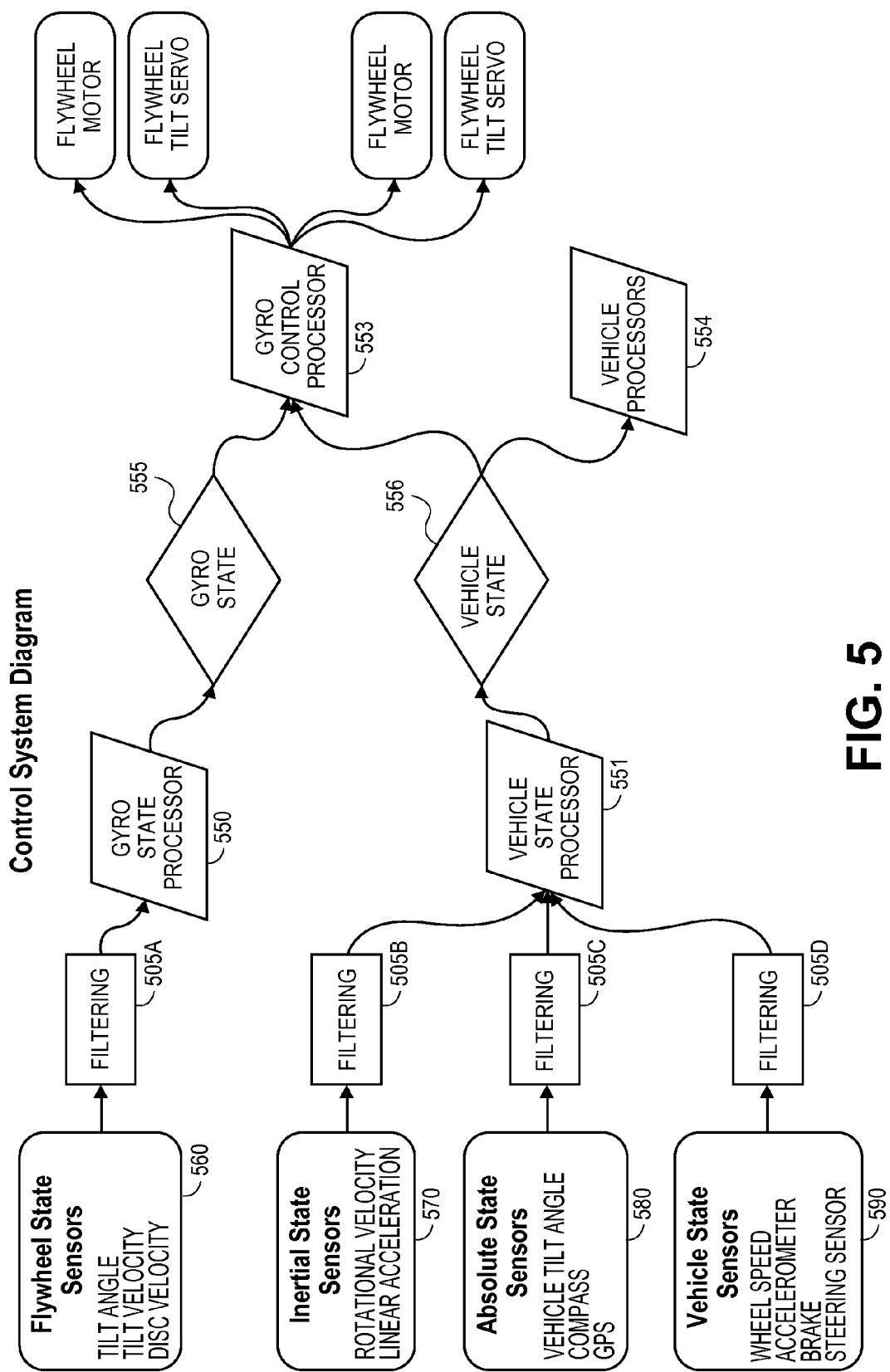
FIG. 5 shows a flow diagram of a control system according to an embodiment of the invention.
Figure 6:
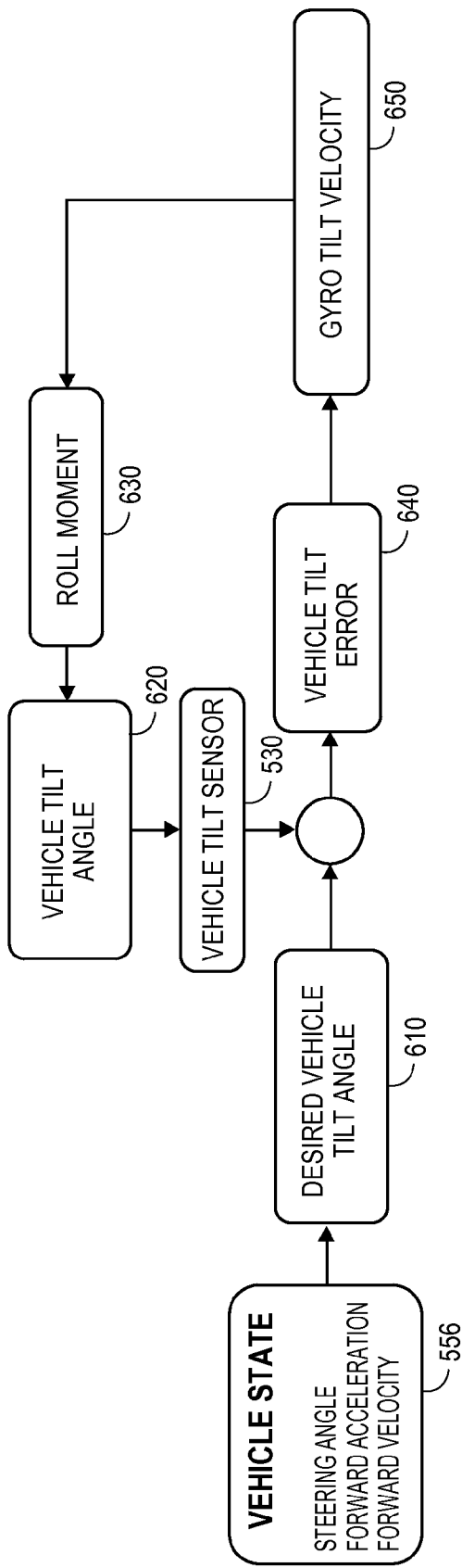
FIG. 6 shows an embodiment of a control system.

Referring to FIGS. 5 and 6, a system controller receives inputs from the plurality of sensors, uses these inputs to determine the actual orientation and state of vehicle 100, and transmits control signals to the precession motors to rotationally accelerate their drive shafts (i.e. to induce precession of flywheels 270a & b about their respective gimbals), thereby creating a counter-torque that is transmitted to vehicle frame 110 to maintain a desired vehicle angle. Processors 550-553 are in electronic communication with sensors indicating the states of various components and vehicle 100 as a whole. In one embodiment, electronic filters 505a-d are interposed to reduce system noise and amplify sensor outputs for use by the processors. Although described as separate "processors" for illustrative purposes, it is to be understood that processors 550-553 may actually comprise fewer or greater than the four physical computer processors/cores shown.

In one embodiment, Inertial Sensors 570 are packaged and processed in a closed module such that the output is the vehicle's inertial state. This inertial state may be calibrated with absolute state sensors mounted on the exterior of vehicle 100 to account for inaccuracies in the inertial sensor measurements.

Gyro State Processor 550 may receive inputs from Flywheel State Sensors 560 coupled to each flywheel. Said Flywheel State Sensors produce signals indicating important measurements including flywheel tilt angle relative to the vehicle frame, flywheel tilt velocity (i.e. the rotational velocity at which the precession motor is rotating the flywheel about its precession axis), and the disk velocity (i.e. the rotation speed of the flywheel disk about its axis of rotation). In one embodiment, Gyro State Processor 550 uses this information to determine the actual instantaneous magnitude and direction of the moment exerted by the gyro stabilizers on vehicle 100, determine the health of system components, and provide for internal optimization to allow for extended use of the gyro stabilization system (i.e., Gyro State 555).

In one embodiment, Vehicle State Processor 551 receives inputs from one or more of Vehicle Inertial State Sensors 570, the Vehicle Absolute State Sensors 580, and Vehicle State Sensors 590 to determine Vehicle State 556. Said Inertial State Sensors may produce electronic signals indicating the rotational and linear acceleration, velocity, and position of vehicle 100. Said Absolute State Sensors may produce electronic signals indicating the vehicle tilt angle direction and magnitude, as well as vehicle direction of travel, speed over ground and absolute geographic position provided by sensors including an electronic compass and GPS receiver. Said Vehicle State Sensors may produce electronic signals indicating drive wheel speed (i.e. rotational speed of each of the drive wheels 200 and 210), the brake status (i.e. the rate of decrease of the vehicle drive wheel 200 and 210 rotational speeds), user inputs to the vehicle through the accelerator 180 and brake 190, and the steering sensor providing the ordered turn radius of the vehicle through steering unit 170. It is to be understood that said user inputs may comprise input from a driver, a computer program, etc.

Vehicle State Processor 551 may determine the vehicle's desired tilt angle 610 for the current conditions and compares this to the vehicle's current tilt angle 620 (including roll movement 630) to determine the Vehicle Tilt Error 640. Said Vehicle Tilt Error may be used by 553 Gyro Control Processor to determine the required precession axis input to produce sufficient counter-torque (shown in reference element 650 of FIG. 6 as 'gyro tilt velocity') to return to or maintain vehicle 100 within desired tilt range 610.

Thus, it is to be understood that, at least in light of the above description and the respective figures, embodiments of the invention describe a vehicle including a processor, a memory, and a control module (or logic) to adjust the orientation or the rotational speed of a gyroscope flywheel based, at least in part, on the current or intended vehicle state. Said vehicle state may be determined by data received from a plurality of sensors included in the vehicle. Said sensors may detect the orientation of the vehicle frame (e.g., tilt angle of the frame), the orientation of the front wheel with respect to the frame, the orientation and rotational speed of the gyroscope flywheel, and the speed of the vehicle.

The control module may further receive input to change the speed or the direction of the vehicle, and adjust the orientation or the rotational speed of the flywheel further based, at least in part, on said received input. The control module may also determine an intended vehicle state based, at least in part, on the received input, and adjust the orientation or the rotational speed of the flywheel further based, at least in part, on said intended vehicle state. For example, if the received input comprises a command to turn the front wheel, the intended vehicle state may be determined to be a turn, and the control module may adjust the orientation or the rotational speed of the flywheel to maintain vehicle stability during the turn.

Embodiments of the invention may further include a power storage unit as shown in FIGS. 3a-h and FIG. 4. In one embodiment, power storage unit 410 includes battery bank 420, storage capacitor bank 430, and switching circuitry, which supply power as well as provide a mechanism for storing and transferring power from rotating components through motor-generators. The electrical current produced through regenerative braking may exceed the ability of the battery bank 420 to absorb energy without damage. It is understood that capacitors are better able to handle such large surges, so in one embodiment the battery bank 420 is selectively placed in parallel electrical communication with the storage capacitor bank 430 and motor-generators 220, 230, and 280a & b, having a common system electrical ground, through power switching circuits. In this way storage capacitor bank 430 acts as an electrical buffer for temporarily storing power surges from system components which exceed the battery capacities, and distributing this stored power either directly to motorized components or by charging the battery bank.

Power storage unit 410, in electrical communication with flywheel motor-generators 280a & b and drive wheel motor-generators 220 and 230, may be used to provide power to vehicle 100, and to transfer energy between flywheels 270a & b and drive wheels 200 and 210 using a motor-generator system. Motor-generators 280a & b and 220 & 230 may be coupled to flywheels 270a & b or to drive wheels 200 & 210, respectively, by mechanical, hydraulic, electromagnetic or other suitable coupling mechanisms known in the art.

At low vehicle speeds gyro stabilizer flywheels 270a & b may rotate at a high speed in order to provide sufficient inertial moment during precession to maintain vehicle stability. As vehicle 100 increases speed, less inertial moment may be required from gyro stabilizer flywheels 270a & b to maintain vehicle stability, so flywheels 270a & b are spun down (to a low speed or allowed to come to a halt). This energy may be recovered and transferred to first and second drive wheel motor-generators 220 and 230 for propulsion. Similarly, when vehicle 100 slows down via engagement of the braking system, energy used to brake vehicle 100 may be recovered and transferred to gyro stabilizer flywheels 270a & b to spin them up to higher rotation speeds to provide stability to vehicle 100 as first and second drive wheels 200 and 210 slow down. Lines A1, A2, B1, B2, C1 and C2, with arrows, illustrate the primary energy flow paths and directions during the above conditions. When lines A1 and A2 are illustrated in a counterclockwise direction, this illustration represents that the drive motor-generators 220 and 230 are in a motor mode, and similarly clockwise represents a generator mode.

Figure 3A:
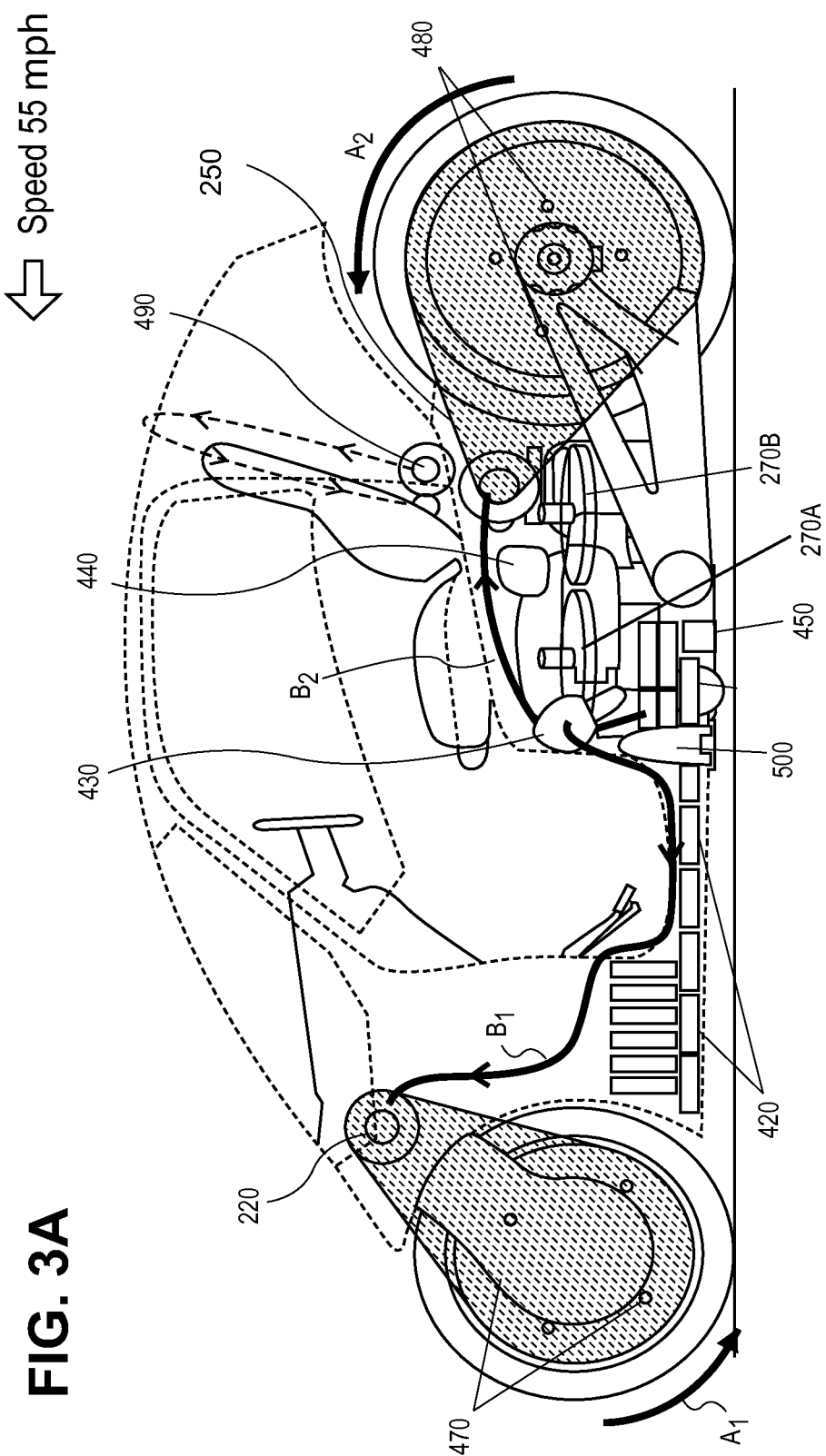

In FIG. 3a, vehicle 100 is shown cruising at a speed of approximately 55 mph (90 kph). In this embodiment, flywheels 270a & b are at very low rotational velocity, essentially at idle speed. Electrical current is flowing from the energy storage unit battery bank 420 to the first and second drive wheel motor-generators 220 and 230, which are operating in the motor mode.

Figure 3B:
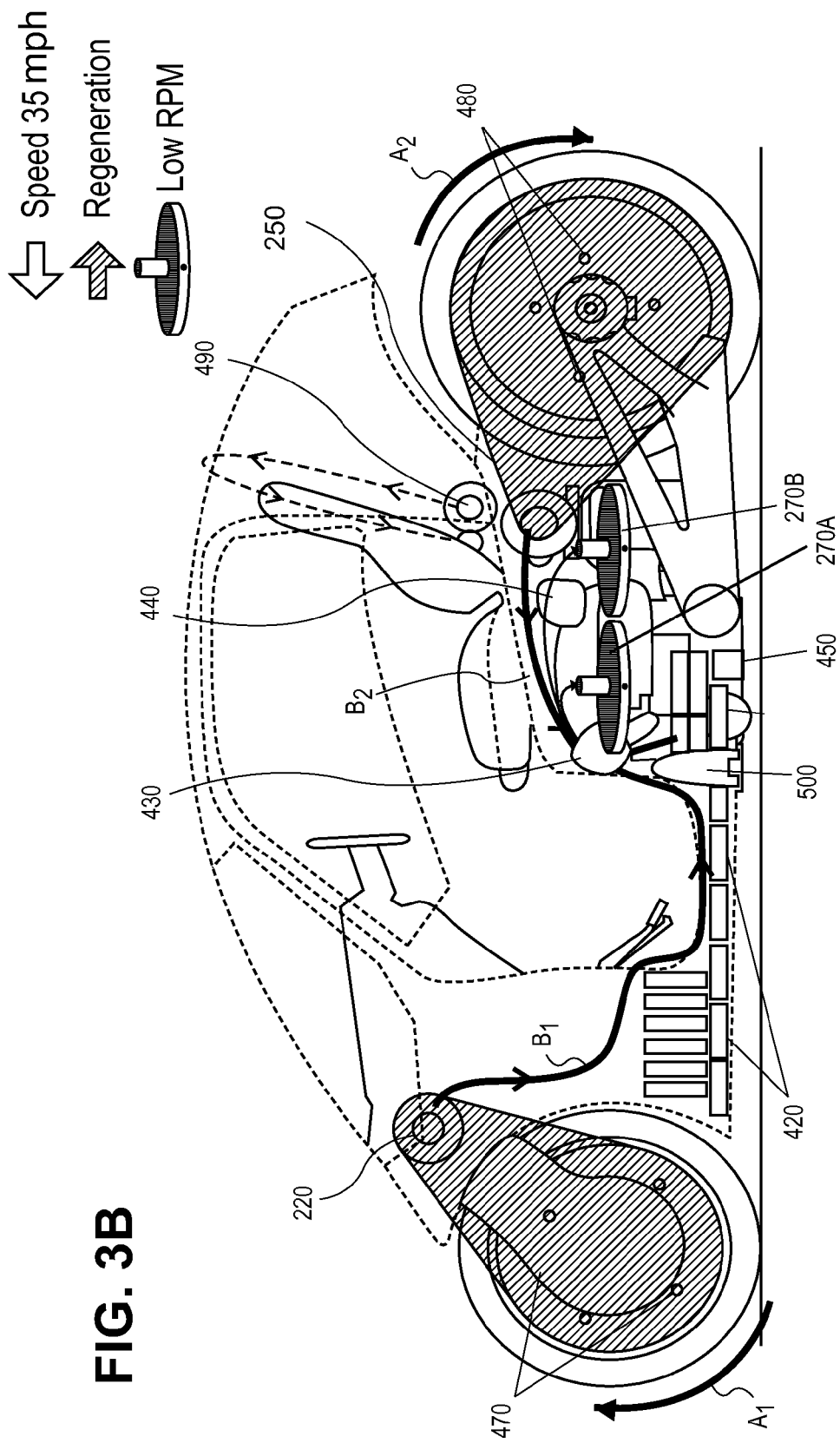

In FIG. 3b, vehicle 100 is ordered to slow to approximately 35 mph (56 kph). In this embodiment, system controller 440 receives the brake input (from an operator or from an automated signal) causing first and second drive wheel motor-generators 220 and 230 to switch to the generator mode thereby generating electrical current, and first and second flywheel motor-generators 280a & b to switch to the motor mode, thereby drawing electrical current and spinning up first and second flywheels 270a & b to a low rotational velocity. System controller 440 causes the power switching circuit to direct the generated current through the capacitor bank to the first and second flywheel motor-generators. First and second flywheels 270a & b may be spun up only to low speed (if at all) if the rotation velocity of first and second drive wheels 200 and 210 still contributes significantly to vehicle stability, so only a relatively small amount of additional counter-torque is required from the gyro stabilization units.

Figure 3C:
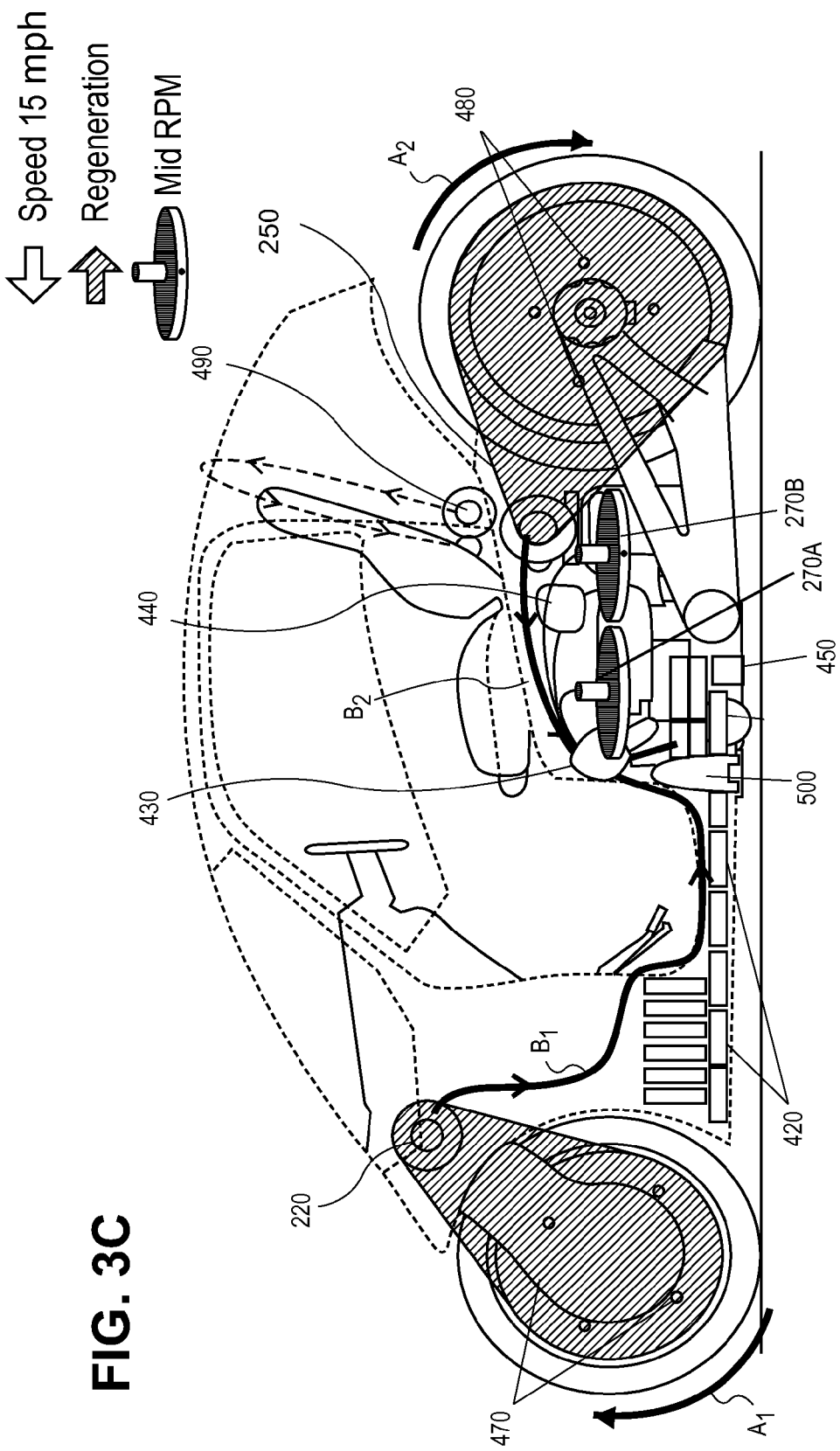

In FIG. 3c, vehicle 100 is ordered to slow from 35 mph (56 kph) to approximately 15 mph (24 kph). System controller 440 receives the brake input and causes first and second drive wheel motor-generators 220 and 230 to switch to the generator mode (or remain in the generator mode) thereby generating electrical current, and first and second flywheel motor-generators 280a & b to switch to (or remain in) the motor mode, thereby drawing electrical current and spinning up first and second flywheels 270a & b to a mid-range rotation speed. System controller 440 causes the power switching circuit to direct the generated current through capacitor bank 430 to first and second flywheel motor-generators 280a & b. In this embodiment, first and second flywheels 270a & b spin up to mid-range rotation speed as the low rotation speed of first and second drive wheels 200 and 210 is not sufficient to maintain vehicle stability.

Figure 3D:
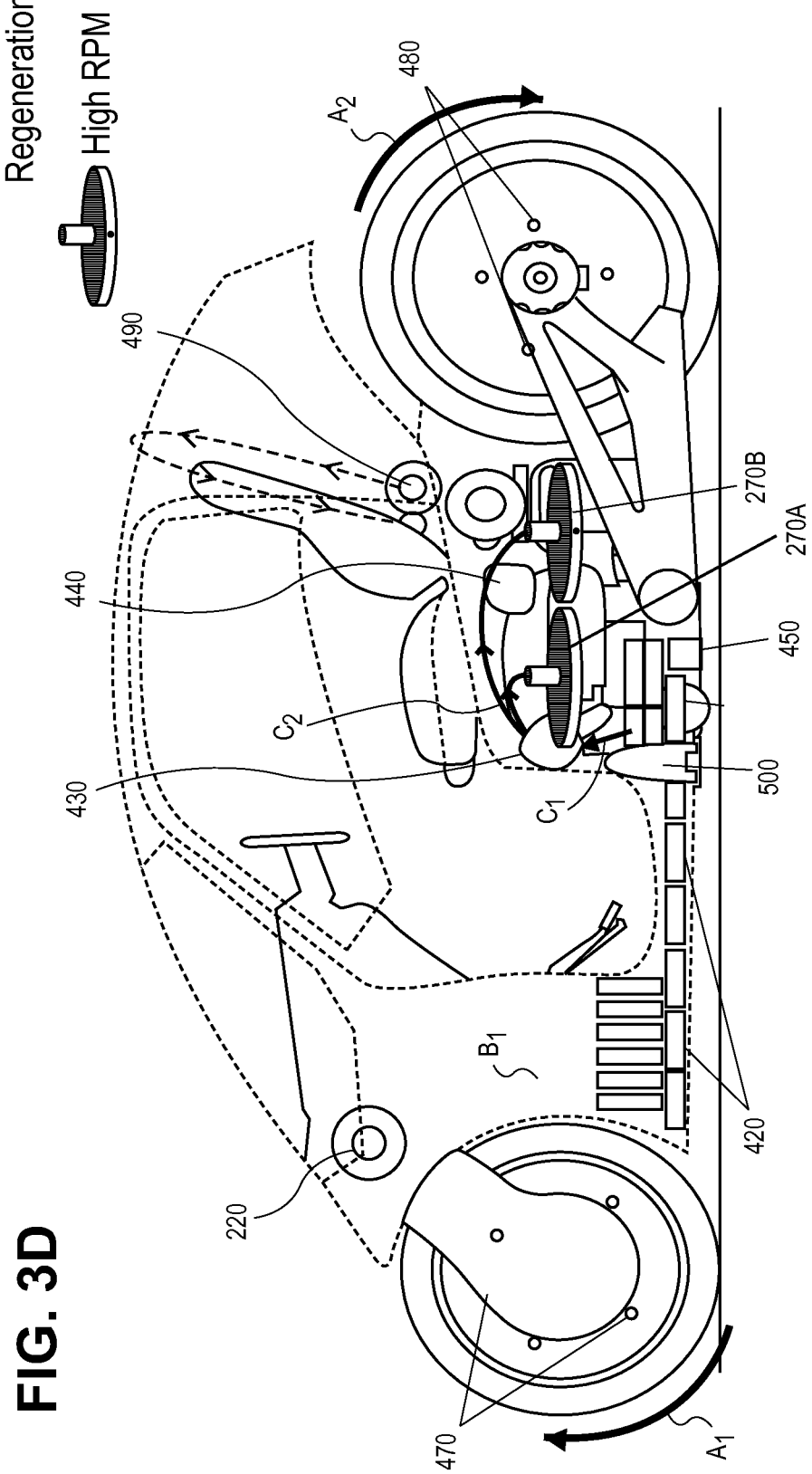

In FIG. 3d, vehicle 100 is stopped. System controller 440 causes first and second flywheels 270a & b to increase to high rotational speed (approximately 10,000 rpm in this embodiment, herein referred to as "hover speed"), because vehicle stability is entirely dependent on counter-torque generated by precessing the gyro stabilization units. First and second flywheel motor-generators 280a & b are in the motor mode and draw electrical current from energy storage unit 410; in one embodiment, current is drawn initially from capacitor bank 430 until the capacitor bank's charge dissipates to a predetermined level, and then from battery bank 420.

In FIG. 3e, vehicle 100 drives away from stop. In this embodiment, system controller 440 causes drive wheel motor-generators 220 and 230 to switch to the motor mode to accelerate the vehicle, and causes flywheel motor-generators 280a & b to switch to the generator mode to slow down flywheels 270a & b. As vehicle 100 accelerates and the rotating drive wheels 200 and 210 contribute more to vehicle stability, first and second flywheels 270a & b are permitted to spin down with their motor-generators in the generator mode. System controller 440 causes the power switching circuit to direct the current generated by flywheel motor-generators 280a & b during spin down to drive wheel motor-generators 220 and 230. If vehicle 100 does not accelerate to a sufficient velocity to contribute significantly to vehicle stability, then flywheels 270a & b may continue to rotate at high speed and continue to draw current from power storage unit 410.

Figure 3F:
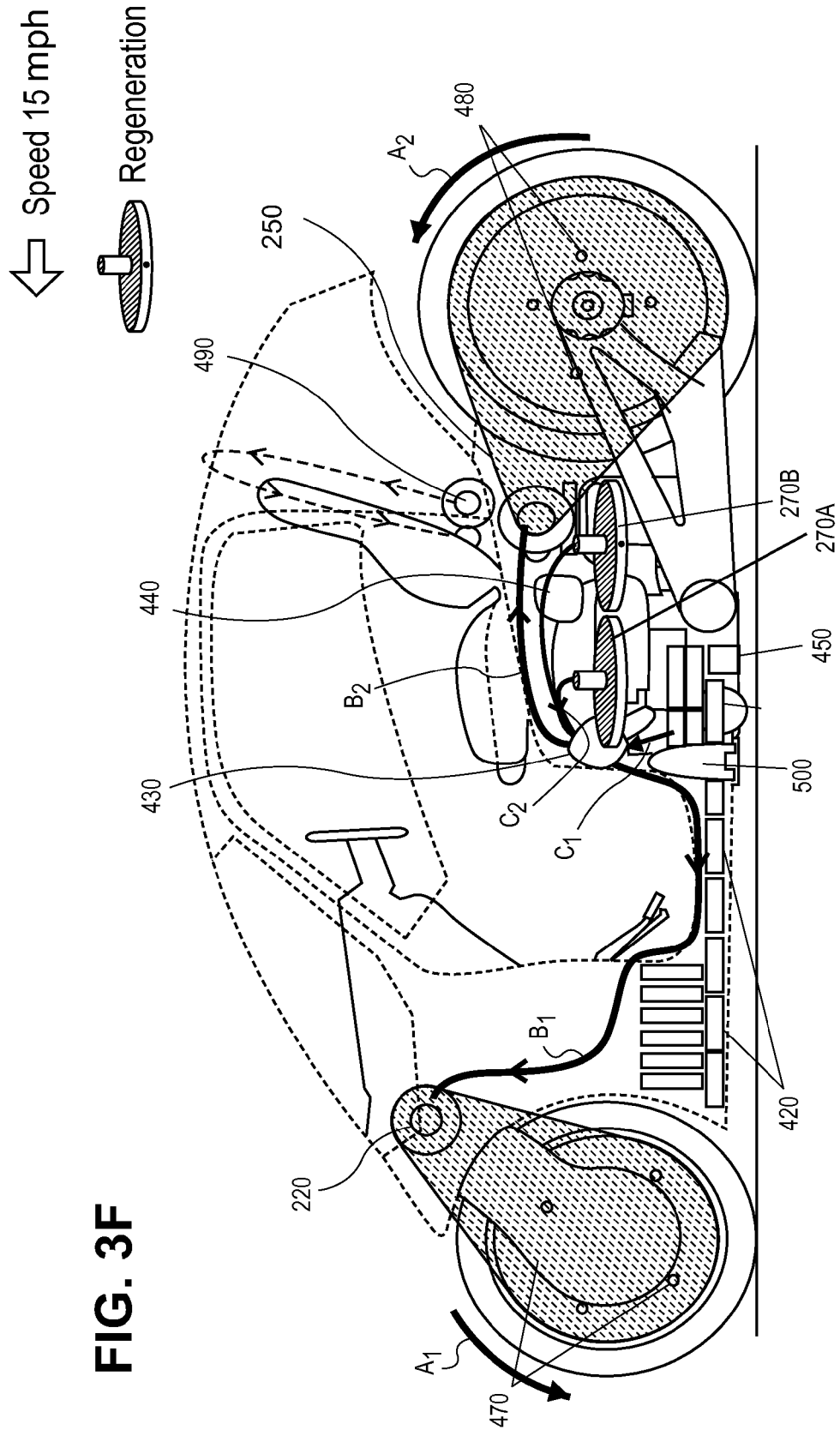
Figure 4:
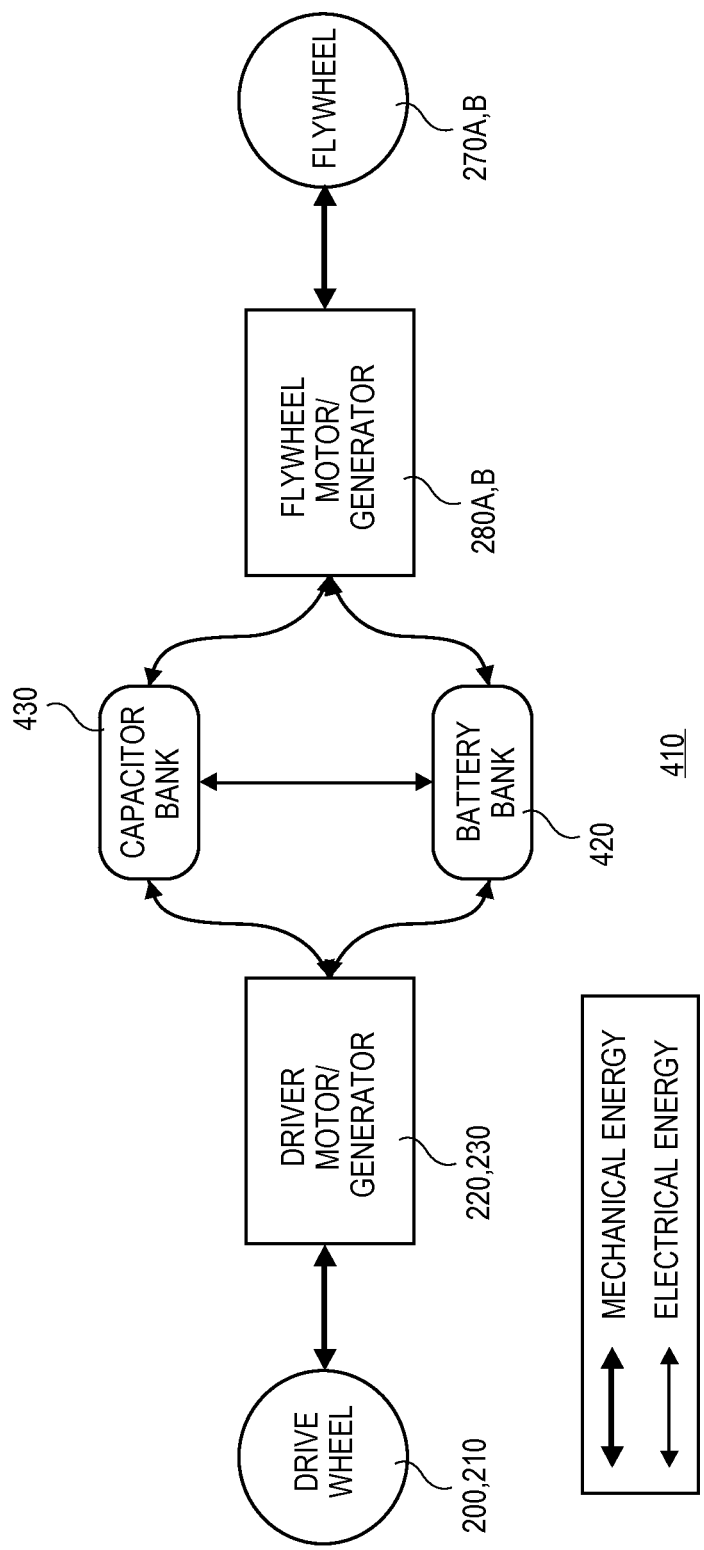
FIG. 4 shows an energy flow diagram according to an embodiment of the invention.

In FIG. 3f, vehicle 100 continues to accelerate to approximately 15 mph (24 kph). In this embodiment, system controller 440 maintains drive wheel motor-generators 220 and 230 in the motor mode to accelerate vehicle 100, and maintains flywheel motor generators 280a & b in the generator mode to continue to spin down flywheels 270a & b. As vehicle 100 accelerates and starts to maintain its own stability, first and second flywheels 270a & b are permitted to spin down with their motor-generators 280a & b in the generator mode. System controller 440 causes the power switching circuit to direct the current generated by flywheel motor-generators 280a & b during spin down to drive wheel motor-generators 220 and 230 via capacitor bank 430.

In FIG. 3g, vehicle 100 continues to accelerate to approximately 35 mph (56 kph). In this embodiment, first and second flywheels 270a & b continue to spin down to low rotation speed and are maintained at this low speed until an ordered vehicle speed change requires a different flywheel rotational speed. System controller 440 causes the power switching circuit to align battery bank 420 in parallel with capacitor bank 430, such that battery bank 420 may provide the primary power for drive wheels 200 and 210.

In FIG. 3h, vehicle 100 is shown in parking mode or long-term stop. Mechanical support mechanism 500 (as shown in the previous figures; in FIG. 3h, shown as components 510 and 520) included in this embodiment may extended to support vehicle 100 when the gyro stabilization units are unable to maintain vehicle stability at a stop—either due to gyro stabilization unit failure or due to a normally ordered shutdown in order to conserve power. Landing gear 500 includes base portion 510 which is coupled to vehicle frame 110 and makes contact with the ground, and extender mechanism 520 which rotates base portion 510 out to deploy and retracts base portion 510 when vehicle 100 is utilizing the gyro stabilization units. In one embodiment, landing gear 500 is also deployed automatically when the flywheel rotation speed drops below the minimum speed required to maintain stability for vehicle 100 or when vehicle sensors indicate the gyro stabilization units are failing to maintain vehicle stability, and vehicle 100 is stopped. First and second flywheels 270a & b may be maintained rotating at minimum idle speed in order to minimize startup time, or they are permitted to coast to a stop with motor-generators 280a & b in the generator mode in order to harvest any remaining energy into battery bank 420.

Upon startup again, flywheel motor-generators 280a & b may be switched to the motor mode, and power storage unit 410 may provide power to flywheel motor-generators 280a & b to spin up "hover speed". By way of example, in this embodiment the hover speed is approximately 10,000 rpm for standard loading conditions with a single occupant. With first and second flywheels 270a & b at hover speed, system controller 440 may raise the landing gear 500 and vehicle 100 will remain stable. System controller 440 will cause the gyro stabilization to precess first and second flywheels 270a & b about their gimbals to compensate for imbalanced static loads and dynamic loads while maintaining vehicle 100 upright.

Thus, it is to be understood that, at least in light of the above description and the respective figures, embodiments of the invention describe a system including a drive wheel motor-generator to transfer energy to and from a drive wheel of a vehicle, a flywheel motor-generator to transfer energy to and from a flywheel included in a gyroscope-stabilizer of the vehicle, a capacitor bank including a battery, and a power controller (implemented as, for example, a module or logic). Said power controller may transfer energy from the flywheel motor-generator to the capacitor bank in response to detecting an input to increase the speed of the vehicle, and transfer energy from the drive wheel motor-generator to the capacitor bank in response to detecting an input to decrease the speed of the vehicle.

Said power controller may also transfer energy from the capacitor bank to the drive wheel motor-generator in response to detecting the input to increase the speed of the vehicle, and transfer energy from the capacitor bank to the flywheel motor-generator in response to detecting the input to decrease the speed of the vehicle.

Said power controller may also transfer energy not required by the drive-wheel motor to the capacitor bank or the battery in response to detecting an input to decrease the speed of the vehicle, and transfer energy not required by the flywheel to the capacitor bank or the battery in response to detecting an input to increase the speed of the vehicle.

Embodiments of the invention further describe, in the event the input to decrease the speed of the vehicle comprises an input to engage a braking system of the vehicle, a braking system that may generate energy transferrable from the drive wheel motor-generator.

Embodiments of said power controller may further transfer energy from the capacitor bank to the flywheel motor-generator based, at least in part, on whether the speed of the vehicle will affect stability of the vehicle. For example, the power controller may determine the input to increase the speed of the vehicle will not affect stability of the vehicle, and transfer energy from the capacitor bank to the flywheel motor-generator in response to determining the input to increase the speed of the vehicle will not affect stability of the vehicle. Embodiments of said power controller may further determine that an input to decrease the speed of the vehicle will affect stability of the vehicle, and transfer energy from the capacitor bank to the flywheel motor-generator in response to determining the input to decrease the speed of the vehicle will affect stability of the vehicle.

Embodiments of the invention further describe a flywheel motor-generator control module (or logic) to control the flywheel of the gyroscope and to operate in a motor mode and a generator mode. The motor mode comprises transferring electrical current to the gyroscope to change the orientation or the rotational speed of the flywheel, and the generator mode comprises transferring electrical current generated by flywheel from the gyroscope. A drive wheel motor-generator control module (or logic) is similarly described, said module to control the front or the rear wheel of the vehicle and to operate in a motor mode and a generator mode. The motor mode comprises receiving electrical current to the rotational speed of the respective wheel, and the generator mode comprises transferring electrical current generated by the respective wheel.

Various components referred to above as processes, servers, or tools described herein may be a means for performing the functions described. Each component described herein includes software or hardware, or a combination of these. The components may be implemented as software modules, hardware modules, special-purpose hardware (e.g., application specific hardware, ASICs, DSPs, etc.), embedded controllers, hardwired circuitry, etc.

Software content (e.g., data, instructions, configuration) may be provided via an article of manufacture including a computer storage readable medium, which provides content that represents instructions that may be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content may be downloaded. A computer readable storage medium may also include a device or product having content stored thereon at a time of sale or delivery. Thus, delivering a device with stored content, or offering content for download over a communication medium may be understood as providing an article of manufacture with such content described herein.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. A vehicle comprising:
a frame;
a front wheel and a rear wheel coupled to the frame;
a first gyroscope and a second gyroscope each coupled to the frame and in-line with the front wheel and the rear wheel, each gyroscope to include a flywheel, wherein the second gyroscope is placed behind the first gyroscope;
a plurality of sensors to detect an orientation of the frame, an orientation of the front wheel with respect to the frame, an orientation and a rotational speed of each of the flywheels of the first gyroscope and the second gyroscope, and a speed of the apparatus vehicle; and
an electronic control system to
determine a vehicle lean based, at least in part, on a data from the plurality of sensors and an input to change at least one of the speed or a direction of the vehicle, and adjust a precession of at least one of the flywheels of the first gyroscope and the second gyroscope so that the flywheels of the first gyroscope and the second gyroscope are counter-precessed to produce an attitude control moment during the vehicle lean; and
adjust an output torque of the first gyroscope and the second gyroscope by adjusting a precession rate of at least one of the flywheels of the first gyroscope and the second gyroscope from an axis of rotation normal to an axis of rotation of the front wheel of the vehicle based, at least in part, on the data from the plurality of sensors, wherein adjusting the precession rate includes minimizing the precession rate in response to determining the vehicle lean to use the output torque of the first gyroscope and the second gyroscope for a prolonged period of time during the vehicle lean.

2. The vehicle of claim 1, wherein the input to change the direction of the vehicle comprises an input to change the orientation of the front wheel with respect to the frame, and the electronic control system to further adjust at least one of the orientation or the rotational speed of at least one of the flywheels of the first gyroscope and the second gyroscope to maintain stability during a turn.

3. The vehicle of claim 1, the electronic control system to further decrease the speeds of the flywheels of the first gyroscope and the second gyroscope when the input to change the vehicle speed comprises an input to increase the speed of the vehicle.

4. The vehicle of claim 1, further comprising a braking system to decrease a speed of at least one of the front wheel or the rear wheel, wherein the input to change the speed of the vehicle comprises an input to engage the braking system, and the electronic control system to further increase the speeds of the flywheels of the first gyroscope and the second gyroscope to increase stability influence.

5. The vehicle of claim 4, wherein the input to change the speed of the vehicle comprises an input to decrease the speed of the vehicle, wherein a first stabilizing torque is generated from rotational velocities of the front wheel and the rear wheel of the vehicle at a decreased vehicle speed, and wherein adjusting the output torque of the first gyroscope and the second gyroscope further includes:
increasing the rotational speeds of the flywheels of the first gyroscope and the second gyroscope to low speeds such that the output torque of the first gyroscope and the second gyroscope is less than the first vehicle stabilizing torque.

6. The vehicle of claim 1, wherein the flywheels of the first gyroscope and the second gyroscope spin in opposite directions with respect to each other.

7. The vehicle of claim 1, wherein the first gyroscope and the second gyroscope are further aligned heightwise.

8. The vehicle of claim 1, wherein the flywheels of the first gyroscope and the second gyroscope each comprise at least one of carbon fiber, steel, brass, bronze, lead or depleted uranium.

9. The vehicle of claim 1, wherein the first gyroscope and the second gyroscope are coupled to the frame via a first and a second set of gimbal mountings, respectively.

10. The vehicle of claim 1, wherein adjusting the precession rate of at least one of the flywheels of the first gyroscope and the second gyroscope further includes:
increasing the precession rate of at least one of the flywheels of the first gyroscope and the second gyroscope to increase the output torque of the the first gyroscope and the second gyroscope.

11. A method comprising:
receiving, via a plurality of sensors, data to indicate an orientation of a frame of a vehicle, an orientation of a front wheel of the vehicle with respect to the frame, an orientation and a rotational speed of each of a first flywheel and a second flywheel, and a speed of the vehicle, wherein the first flywheel and the second flywheel are included in a first gyroscope and a second gyroscope, respectively, coupled to the frame and in-line with the front wheel of the vehicle and a rear wheel of the vehicle, and wherein the second gyroscope is placed behind the first gyroscope;

determining a vehicle lean based, at least in part, on the data received from the plurality of sensors and an input to change at least one of the speed or a direction of the vehicle;

adjusting a precession of at least one of the flywheels of the first gyroscope and the second gyroscope so that the flywheels of the first gyroscope and the second gyroscope are counter-precessed to produce an attitude control moment during the vehicle lean; and adjusting an output torque of the first gyroscope and the second gyroscope by adjusting a precession rate of at least one of the flywheels of the first gyroscope and the second gyroscope from an axis of rotation normal to an axis of rotation of the front wheel of the vehicle based, at least in part, on the data received from the plurality of sensors, wherein adjusting the precession rate includes minimizing the precession rate in response to determining the vehicle lean to use the output torque of the first gyroscope and the second gyroscope for a prolonged period of time during the vehicle lean.

12. The method of claim 11, wherein the input to change the direction of the vehicle comprises an input to change the orientation of the front wheel with respect to the frame, and the method further comprises:

adjusting at least one of the orientation or the rotational speed of at least one of the flywheels of the first gyroscope and the second gyroscope to maintain stability during a turn.

13. The method of claim 11, further comprising:

decreasing the speed of the first flywheel and the second flywheel when the input to change the speed of the vehicle comprises an input to increase the speed of the vehicle.

14. The method of claim 11, the vehicle to further include a braking system to decrease a speed of at least one of the front wheel or the rear wheel, wherein the input to change the speed of the vehicle comprises an input to engage the braking system, and the method further comprises:

increasing the speed of the first flywheel and the second flywheel to increase stability influence.

15. The method of claim 14, wherein the input to change the speed of the vehicle comprises an input to decrease the speed of the vehicle, wherein a first stabilizing torque is generated from rotational velocities of the front wheel and the rear wheel of the vehicle at a decreased vehicle speed, and wherein adjusting the output torque of the first gyroscope and the second gyroscope further includes:

increasing the rotational speed of the first flywheel and the second flywheel to low speeds such that the output torque of the first gyroscope and the second gyroscope is less than the first vehicle stabilizing torque.

16. The method of claim 11, wherein the first flywheel and the second flywheel spin in opposite directions with respect to each other.

17. The method of claim 11, wherein the first flywheel and the second flywheel each comprise at least one of carbon fiber, steel, brass, bronze, lead or depleted uranium.

18. The method of claim 11, wherein the first gyroscope and the second gyroscope are coupled to the frame via a first and a second set of gimbal mountings, respectively.

19. The method of claim 11, wherein adjusting the output torque of the first gyroscope and the second gyroscope by adjusting the precession rate of at least one of the flywheels of the first gyroscope and the second gyroscope further includes:

increasing the precession rate of at least one of the flywheels of the first gyroscope and the second gyroscope to increase the output torque of the first gyroscope and the second gyroscope.

* * * * *